(12) United States Patent
Trojanowski et al.

(10) Patent No.: US 7,798,669 B2
(45) Date of Patent: Sep. 21, 2010

(54) MARINE LANTERN CONTROLLED BY GPS SIGNALS

(75) Inventors: Alan Trojanowski, Dayton, TX (US); Gregory Lei Fan, Cypress, TX (US)

(73) Assignee: Automatic Power, Inc., Houston, TX (US)

( * ) Notice: Subject to any disclaimer, the term of this patent is extended or adjusted under 35 U.S.C. 154(b) by 472 days.

(21) Appl. No.: 11/899,303

(22) Filed: Sep. 5, 2007

(65) Prior Publication Data

US 2009/0129067 A1 May 21, 2009

Related U.S. Application Data

(60) Provisional application No. 60/850,783, filed on Oct. 11, 2006.

(51) Int. Cl.
*F21L 4/00* (2006.01)
(52) U.S. Cl. ............... 362/208; 362/157; 340/332; 340/321
(58) Field of Classification Search .......... 362/106, 362/157, 208; 340/321, 332, 815.73, 815.74
See application file for complete search history.

(56) References Cited

U.S. PATENT DOCUMENTS

| | | | | |
|---|---|---|---|---|
| 4,486,820 A * | 12/1984 | Baba et al. | ............ | 362/183 |
| 4,782,432 A * | 11/1988 | Coffman | ............ | 362/184 |
| 5,362,267 A | 11/1994 | Forrest | | |
| 5,741,167 A | 4/1998 | Hagerty | | |
| 6,107,941 A * | 8/2000 | Jones | ............ | 340/915 |
| 6,459,387 B1 | 10/2002 | Kobayashi et al. | | |
| 6,585,391 B1 * | 7/2003 | Koch et al. | ............ | 362/205 |
| 6,758,160 B1 | 7/2004 | Martin | | |
| 7,264,372 B2 * | 9/2007 | Maglica | ............ | 362/202 |
| 2005/0135104 A1 * | 6/2005 | Crabb et al. | ............ | 362/276 |

* cited by examiner

*Primary Examiner*—David V Bruce
*Assistant Examiner*—Danielle Allen
(74) *Attorney, Agent, or Firm*—Elizabeth R. Hall

(57) ABSTRACT

A remotely adjustable lighting device configured to an operational mode customized for the geographic location of the device. The lighting device is powered by a battery provided with solar charging. The lighting device, under control of an integral controller, is turned off and on for an illumination period as a function of both local sunrise and sunset times determined by a combination of time and date information and GPS positioning. The luminosity of the lighting device is autonomously controlled as a function of battery charge and the determined required illumination period. The solar charging system is oriented by the controller to optimize its energy collection by periodical adjustments.

19 Claims, 8 Drawing Sheets

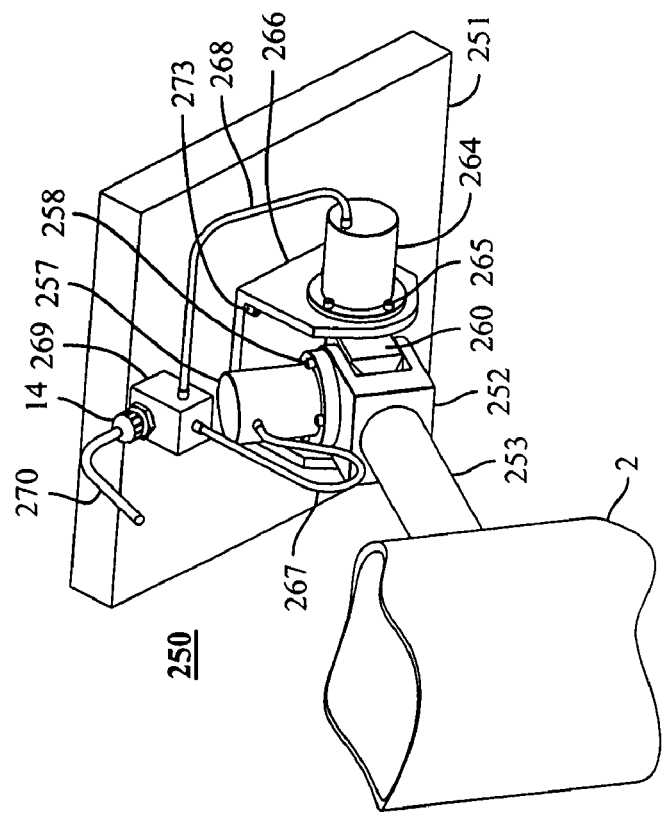
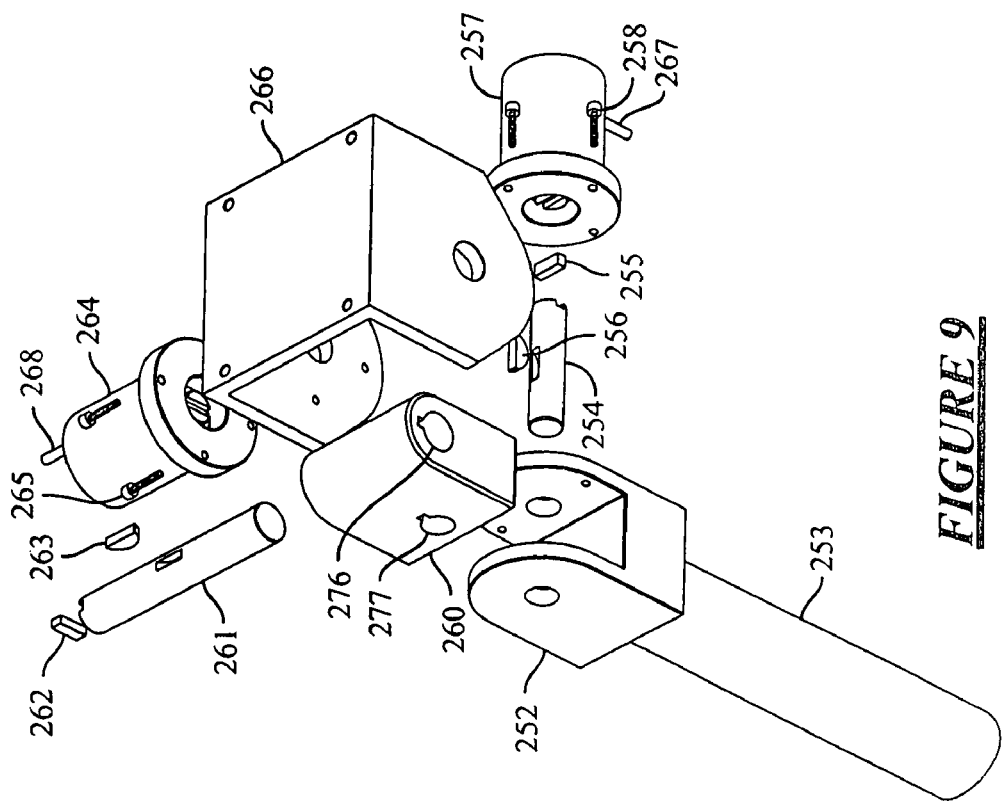
*FIGURE 8*
*FIGURE 9*

MARINE LANTERN CONTROLLED BY GPS SIGNALS

CROSS REFERENCE TO RELATED APPLICATIONS

This application claims priority to pending U.S. patent application Ser. No. 60/850,783, filed Oct. 11, 2006 by inventors Alan Trojanowski and Gregory Lei Fan and entitled "Marine Lantern Controlled by GPS Signals."

BACKGROUND OF THE INVENTION

1. Field of the Invention

The present invention relates generally to a remotely adjustable lighting device powered by a rechargable battery provided with solar charging. More particularly, the invention relates to a remotely adjustable lighting device that is turned on and off for an illumination period as a function of local sunrise and sunset times determined by a combination of time and date information and GPS positioning.

2. Description of the Related Art

Reliable warning lights are critical for the safety of marine and aircraft vessels to prevent accidental collisions with fixed structures, such as offshore platforms, radio towers, high bridges and the like, as well as for floating structures, such as buoys. Frequently, these warning light units are operated with a unique flash pattern so that a particular light location may be recognized readily by mariners or aircraft. For remote locations, these light units are typically powered by one or more batteries, with the batteries being recharged by solar cells.

Conventional warning lighting systems require considerable prior knowledge about the local conditions where any light system will be installed. This prior knowledge is necessary in order to properly size the solar power collection system and the batteries for the lighting system. Among the factors which must be known are variations in day length, seasonal cloud cover, and mean solar position during daylight. Obtaining and applying this information involves considerable effort and time.

Furthermore, conventional warning lighting systems have no means of adjusting to unusual temporary increases in cloudiness, which may markedly reduce the solar energy gathered by the solar cells for a temporary period. This limitation necessitates that the solar panels and battery systems must be oversized for conventional lighting systems.

In order to provide economies of scale for manufacturing and to reduce the engineering effort in configuring an overall lighting system, it is desirable that warning lighting systems be designed to function under as broad a range of conditions as possible. It is highly desirable to have a single design of a warning lighting system, or a very limited range of system designs, that can operate in sun-drenched areas as well as in minimal-sun areas such as arctic areas. By having a lighting system controller and light emitting assembly design compatible with only a very limited number of solar panel and battery sizes, manufacturing runs, purchased parts orders, and inventories can be made for larger quantities to minimize costs. However, present day warning light devices are not suitable for universal applicability.

There exists a continuing need to provide a high-intensity warning light system that is remotely adjustable to a specific geographic location to adapt to the specific characteristics of that location, such as variations in nighttime duration and the annually and daily cycling angles of incident solar radiation relative to the lighting system.

There is an additional need for a solar powered lighting system where the positioning of the solar panels is remotely adjustable for the optimal collection of sun rays.

There is a further need for a lighting system that communicates by a two-way radio link with a remote station so that the lighting system can receive external instructions and report its operational status.

SUMMARY OF THE INVENTION

The present invention relates generally to a remotely adjustable lighting device powered by a rechargable battery provided with solar charging. More particularly, the invention relates to a remotely adjustable lighting device that is turned on and off for an illumination period as a function of local sunrise and sunset times determined by a combination of time and date information and GPS positioning.

The present invention is a remotely adjustable lighting device configured to an operational mode customized for the geographic location of the device. The lighting device is powered by a battery provided with solar charging. The lighting device, under control of an integral controller, is turned off and on for an illumination period as a function of both local sunrise and sunset times determined by a combination of time and date information and GPS positioning. The luminosity of the lighting device is autonomously controlled as a function of battery charge and the determined required illumination period. The solar charging system is oriented by the controller to optimize its energy collection by periodical adjustments.

One embodiment of the present invention is a lighting device comprising: (a) a light emitting apparatus having an adjustable luminosity and an adjustable flash pattern; (b) a rechargeable battery; (c) a solar panel, wherein the battery is recharged by solar energy collected by the solar panel; and (c) a controller in communication with the light emitting apparatus, the battery, and the solar panel, wherein the controller adjusts the luminosity and the flash pattern of the light emitting apparatus to reflect the amount of solar energy available to the solar panel.

A second embodiment of the present invention is a lighting device comprising: (a) a light emitting apparatus having an adjustable luminosity and an adjustable flash pattern; (b) a rechargeable battery; (c) a repositionable solar panel, wherein the battery is recharged by solar energy collected by the solar panel; and (c) a programmable controller assembly having a receiver for acquiring a set of transmitted information, a processor, wherein the processor utilizes the transmitted information to determine an amount of solar energy available to the solar panel based on a specific geographic location of the lighting device and a current date, a sunset time, a sunrise time, and a solar insolation value corresponding to the specific geographic location of the lighting device; and a system for adjusting the luminosity and the flash pattern of the light emitting apparatus to reflect the amount of solar energy available to the solar panel.

A third embodiment of the present invention is a lighting device comprising: (a) a marine lantern having an adjustable luminosity and an adjustable flash pattern, wherein the marine lantern includes a plurality of LEDs disposed in a radial array about a vertical axis, a central member having each LED mounted on a vertical surface thereof, the central member made of a thermally conductive material to conduct heat away from the LEDs, and a Fresnel lens disposed about the vertical axis surrounding the LEDs; (b) a rechargeable battery; (c) a biaxially adjustable solar panel, wherein the battery is recharged by solar energy collected by the solar panel; and (c) a programmable controller assembly having a receiver for acquiring a set of transmitted information, a processor that utilizes the transmitted information to determine an amount of solar energy available to the solar panel based on a specific geographic location of the lighting device and a current date, a sunset time, a sunrise time, and a solar insolation value corresponding to the specific geographic location of the lighting device, a memory storage unit in communication with the processor, wherein the programmable controller assembly is in communication with the marine lantern, the battery, and the solar panel; whereby the controller assembly adjusts the luminosity and the flash pattern of the light emitting apparatus to reflect the amount of solar energy available to the solar panel and the controller repositions the solar panel to optimize the collection of solar energy.

A fourth embodiment of the present invention is a method of operating a lighting device to enable the lighting device to be customized to a specific location with known sunrise/sunset times, wherein the lighting device comprises a rechargeable battery, a solar panel for collecting solar energy and recharging the battery and at least one light emitting apparatus to provide illumination, comprising the steps of: acquiring the location and current time/date for the lighting device; accessing sunrise/sunset data for the location and current date; determining the amount of solar energy collection time for the location and current date based on the sunrise/sunset data and the location; determining the amperage needed during nighttime to operate the light emitting apparatus at a desired luminosity and flash; calculating the potential solar energy recharge amount for the current date based on the location and collection time for the current date; adjusting the desired luminosity and flash based on the solar energy recharge available; operating the light emitting apparatus at the adjusted luminosity and flash; and during the daytime, deactivating the light emitting apparatus, collecting solar energy on the solar panel and recharging the battery with the collected solar energy as needed.

The foregoing has outlined rather broadly several aspects of the present invention in order that the detailed description of the invention that follows may be better understood and thus is not intended to narrow or limit in any manner the appended claims which define the invention. Additional features and advantages of the invention will be described hereinafter which form the subject of the claims of the invention. It should be appreciated by those skilled in the art that the conception and the specific embodiment disclosed may be readily utilized as a basis for modifying or designing of the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 is an oblique view of a second embodiment of a solar panel assembly, wherein the solar panel is able to be pivoted about both horizontal and vertical axes.

FIG. 9 is an exploded oblique view of the support and pivoting mechanism for the solar panel of FIG. 8.

Figure 1:
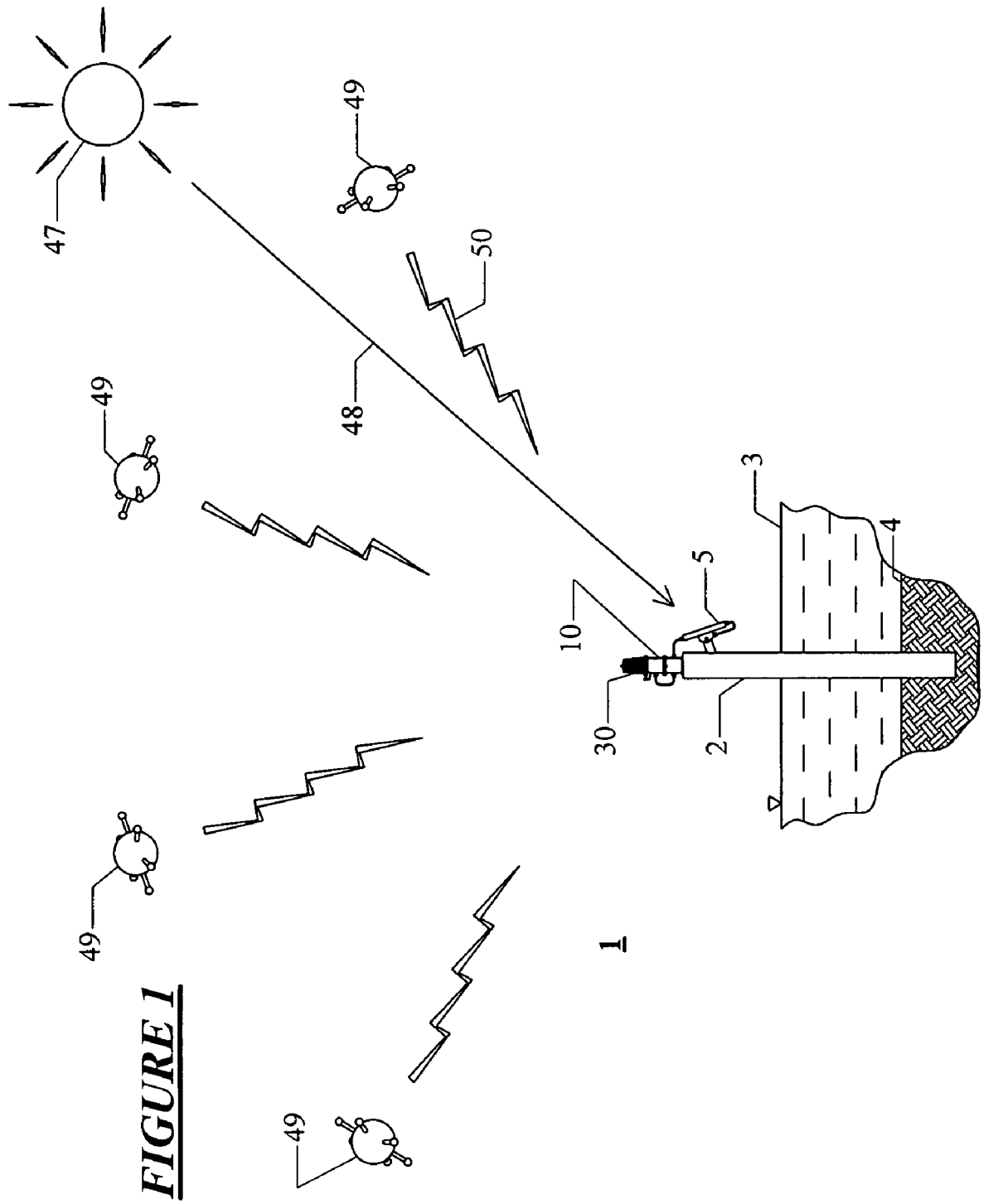
FIG. 1 is a schematic view showing a first preferred embodiment of the marine lantern system of the present invention, wherein the lantern is mounted offshore on a piling.

It is noted that like reference characters designate like or similar parts throughout the drawings. The figures or drawings are not intended to be to scale. For example, purely for the sake of greater clarity in the drawings, wall thicknesses and relative dimensions are distorted from those in the actual embodiments.

DESCRIPTION OF THE PREFERRED EMBODIMENTS

The lighting device of the present invention is typically used for remotely located navigation or warning lights used with offshore structures, buoys, bridges, and tall communication towers. The housing and internal components of the lighting device are typically constructed of low carbon steel, stainless steel, and aluminum alloys. The lens of the light is typically constructed of acrylic or polycarbonate plastic. Either light emitting diodes (LEDs) or incandescent bulbs can be used as the lighting source. An optional etched glass diffuser is commonly used when light emitting diodes are used.

The cells of the photoelectric solar array are typically made of polycrystalline silicon, and insulated copper wiring is generally used. The electronic circuitry typically uses commercially available logic chips, diodes, resistors, and capacitors mounted on conventional printed circuit boards. Alternative materials, currently in use or to be developed, are substitutable for many of the constituent components of the lighting device.

A key element of the present invention is an integral Global Positioning System receiver unit. The Global Positioning System (GPS) is a satellite-based radio-navigation system developed and operated by the U.S. Department of Defense (DOD). Use of GPS permits land, sea and airborne users to determine their three-dimensional positions, velocities, and times regardless of the weather conditions, 24 hours per day, anywhere in the world with very fine precision and accuracy. Multiple GPS satellites are spaced in orbit so that at any time a minimum of six satellites are in view to users anywhere in the world. The satellites continuously broadcast position and time data to users throughout the world. A commercially available GPS receiver unit consisting of an integrated GPS radio receiver, a processor, and an antenna can permit a land, sea and airborne operator to receive the GPS satellite broadcasts in order to compute the precise position, velocity, and time at the receiver unit.

The GPS receiver unit of the lighting device allows a user to determine the position of the lighting device on the earth by measuring its distance from the group of satellites in space. The satellites act as precise reference points. Each GPS satellite transmits an accurate position and time signal. The user's receiver measures the time delay for the signal to reach the receiver, which is the direct measure of the apparent range to the satellite. Measurements collected simultaneously from four satellites are processed to solve for the three dimensions of position, velocity and time.

If a user knows the exact geographic location of the lighting device and the time and date at that location, then the user can obtain sunrise and sunset data for that specific location from several sources. One such source is the U.S. Naval Observatory. By providing the latitude and longitude of a specific location, the Observatory will provide the sunrise and sunset data for any specific day or for an entire year. This data can be either entered into an integral memory of the present invention by coded instructions, or it can be transmitted by radio to the lighting system at determined intervals.

First Embodiment of the Lighting System

Figure 3:
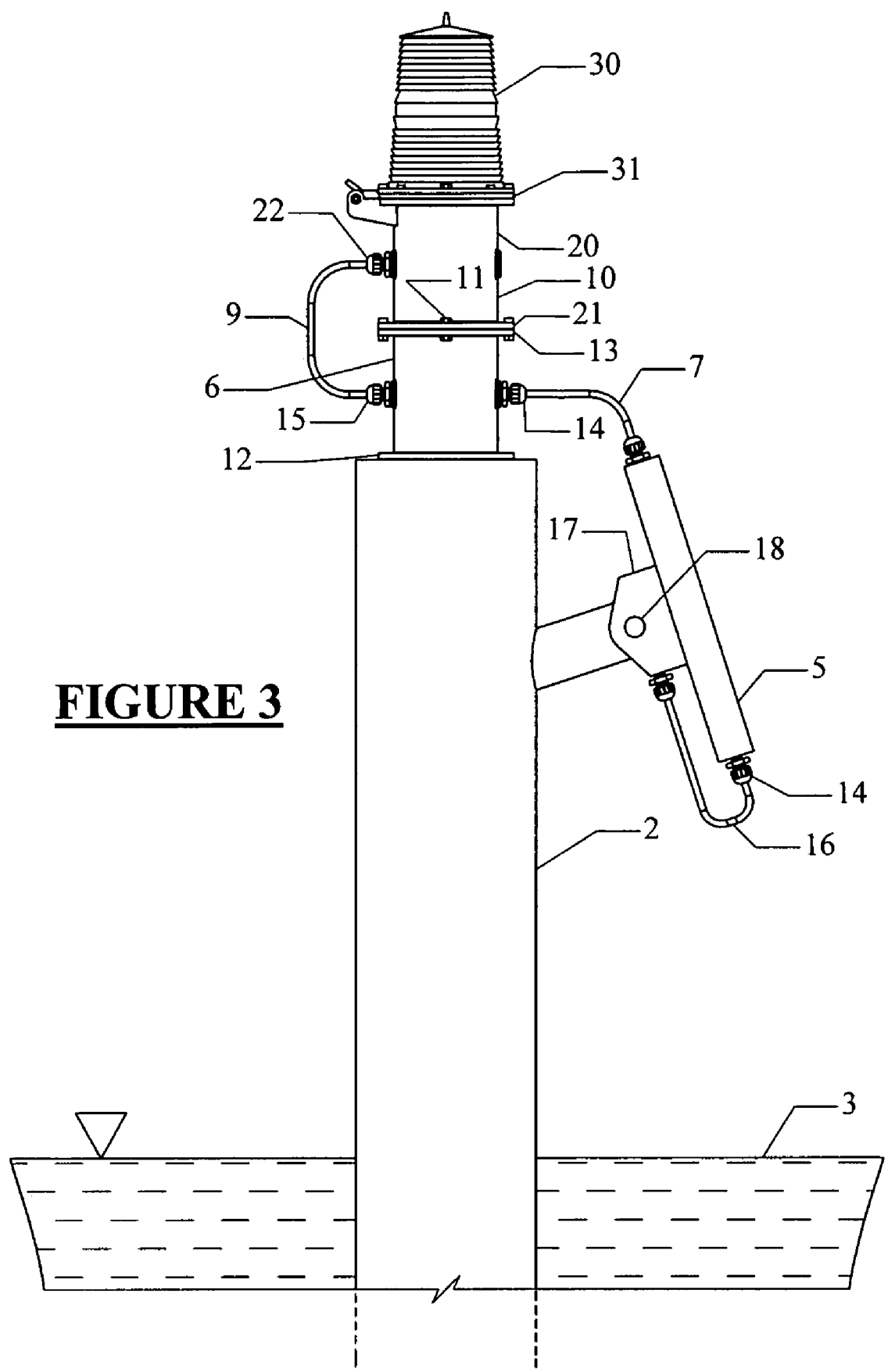
FIG. 3 is a more detailed side profile view of lantern portion of the present invention of FIGS. 1 and 2 mounted on a piling.
Figure 4:
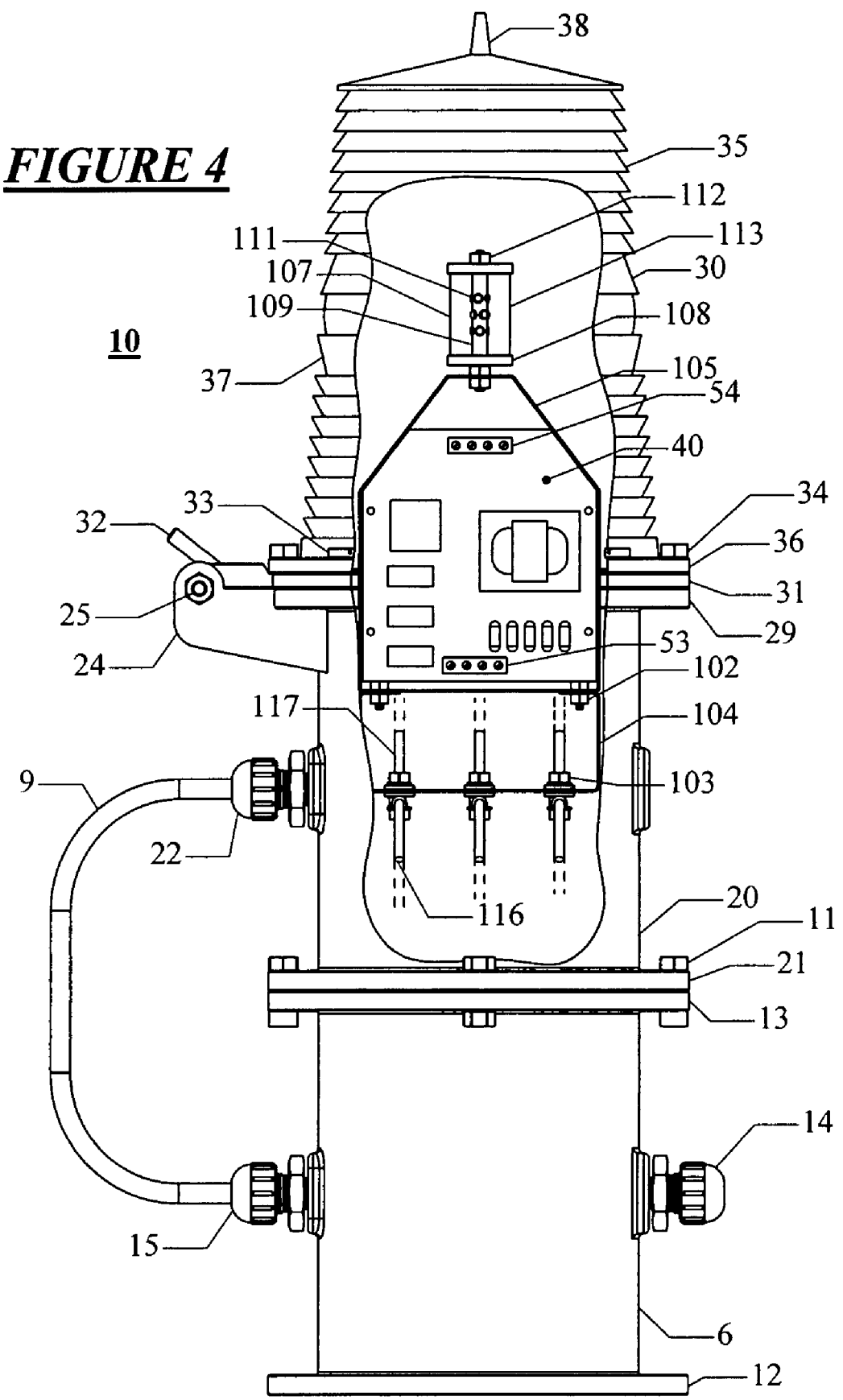
FIG. 4 is a partially cutaway detailed view of the lantern portion of FIG. 3.

FIG. 1 shows a first embodiment of the lighting system 1 which includes the lighting device 10 of the present invention, wherein by way of example the lighting device is located on a vertical offshore piling structure 2 which is surrounded by water 3 and embedded in the seabed 4. The lighting device 10, shown in more detail in FIGS. 3 and 4, is attached rigidly to the upper end of the piling 2 sufficiently far above the surface of the water 3 that it is above splashing from passing wave crests at high tide during storms. Alternatively, the lighting device 10 can be positioned on a variety of other types of structures.

The electrical power necessary to operate the lighting device 10 is provided by a solar collector panel 5, which is able to collect and convert solar energy to electricity. Solar collector 5 is used to charge a battery or batteries 41 (shown in FIG. 5) in a battery case 6 integrally mounted with the lighting device. The collectors of the solar panel 5 are generally standard commercially available components mounted in a planar housing. In some cases, a larger nonintegral battery case 6 will be used, but that is not shown herein.

The solar panel 5 is mounted to the piling 2 with an integral pivoting bracket 17 having a horizontal axis pin 18 that allows orientation of the solar panel 5 as designated by the user or by coded instructions in the integral memory. For example, the solar panel 5 is oriented in the northern hemisphere to be facing southwardly and with a mean position inclined from vertical to be approximately facing the sun at the equinoxes. The bracket 17 is provided with a servo mechanism (not shown), powered and controlled through cables 7 and 16, which pivots the planar collector portion of the solar panel 5 about pin 18 to maximize the panel's potential for energy collection at any given time of the year. The cable 16 is sealingly connected at a first end to the panel 5 and at a second end to the servo of the bracket 17 by a commercially available water-tight fitting 14. Power for the servo mechanism of the pivoting bracket 17 is obtained through cable 7, internal connections within the solar panel 5, and the cable 16. Commercially available pivoting solar panel mounts may be used for the bracket 17.

The battery case 6 may be any configuration and may be positioned in a various sites in relation to the lighting device, as long as the batteries within the battery case are in communication with the lighting device. For example, the battery case 6, illustrated in FIG. 3, is a body of revolution about a vertical axis having a right circular cylindrical annular shell with outwardly extending lower 12 and upper transverse flanges 13. The lower end of the battery case 6 is sealed by a transverse bulkhead. The battery case 6 is mounted to the upper horizontal end of the piling 2 by means of battery case mounting screws engaged through a regularly spaced bolt hole circle in the lower flange 12. A similar set of bolt holes is provided in the upper flange 13 for mounting the base section 20 of the lighting device 10 to the battery case 6. At approximately midheight of the battery case 6 is a pair of diametrically opposed radially outwardly extending bosses, which have radial drilled and tapped holes for engagement by water-tight fittings 14 or 15.

A solar panel power cable 7, sealingly connected at both ends by a commercially available water-tight fitting 14, extends from the solar panel 5 to the battery case 6, where it penetrates into the battery case 6 through one of the drilled and tapped holes of the case and is connected to the battery or batteries 41. The cable 7 also conveys control signals and power to the cable 16 and the servo motor of bracket 17 of the solar panel 5 through connections internal to the panel 5. The servo control and power connections integral with cable 7 are connected to the controls of the lighting device.

An electrical power cable 9 is attached to the battery 41 at its first end and to power terminals 103 at its second end, where it is separated into individual input power lines. Electric power cable 9 passes through drilled and tapped holes in the battery case 6, where it is sealingly gripped by a water-tight fitting 15. Multiconductor electric power cable 9 is of conventional commercially available construction and consists of multiple individually insulated conductors 116 contained within an elastomeric outer jacket and provided with end terminal connectors.

Base section 20 of the lighting device 10 is a body of revolution about a vertical axis having a right circular cylindrical annular shell with outwardly extending lower 21 and upper transverse flanges 29. Additionally, a hinge bracket 24 extends radially outwardly from the annular shell of the base section 20 at the upper flange 29. The hinge bracket 24 is symmetrical about a vertical radial plane and has two outwardly and upwardly extending parallel ears, with the ears having coaxial holes which are normal to the radial vertical plane of symmetry for the hinge bracket. The coaxial holes in the ears of the hinge bracket 24 mount a cylindrical hinge pin 25. At approximately midheight of the base section 20, a radially outwardly extending boss has a centrally located drilled and tapped hole which is sealing engaged by the threads of a commercially available water-tight fitting 22. The power cable 9 from the battery case 6 enters the base section 20 through the tapped hole in the boss and is sealingly gripped there by the water-tight fitting 22.

In FIGS. 3 and 4, the diameters of the cylindrical shells of the base section 20 and the battery case 6 are the same. The lower flange 21 of the base section 20 and the upper flange 13 of the battery case are also shown as having the same diameter. The base section 20 of the lighting device 10 is mounted directly above and coaxially with the battery case 6. A regularly spaced bolt hole circle corresponding to that in the battery case top flange 13 is provided in the lower flange 21 of the base section 20. Multiple fasteners, each consisting of a screw and nut, are threadedly engaged in the regularly spaced bolt hole circles of the upper flange 13 of the battery case 6 and the lower flange 21 of the base section to sealingly clamp the two flanges together. A gasket or a layer of suitable sealant compound (not shown) is applied between the flanges 13 and 21 to ensure a water-tight connection. Vertical drilled and tapped mounting holes in the upper face of the upper flange 29 are provided so that the controller mounting bracket 105 supporting the controller assembly 40 can be mounted to that surface.

The lens assembly 30 consists of a mounting ring 31, a lens 35, lens hold-down screws 34, and mounting ring screws 33. The lens mounting ring 31 is an axially relatively thin right circular cylindrical annular plate. The lens mounting ring 31 has an outer diameter approximately equal to that of the upper flange 29 of the base section 20 and an inner diameter larger than the inner diameter of the shell of the base section. Extending radially outwardly on one side, the mounting ring 31 has an integral lens hinge 32 rectangular projection with a distal downwardly extending thickened section having a transverse hole through which the hinge pin 25 of the hinge bracket 24 of the base section 20 is extended. The lens hinge 32 is symmetrical about its radial midplane. The width normal to the radial direction of the lens hinge 32 is such that the lens hinge is a close fit between the ears of the hinge bracket 24 of the base section 20. The location of the transverse hole in the lens hinge 32 of the mounting ring 31 is such that the lens assembly 30 is able to sit coaxially on the base section 20 with the lower transverse end of the lens assembly abutting the upper flange 29 of the base section. A planar tab inclined upwardly from the horizontal plane of the mounting ring 31 is located at the outer edge of the lens hinge 32 so that it can serve as a travel stop when the lens assembly 30 is opened.

A bolt hole circle in mounting ring 31 having the same diameter and spacing as that of the drilled and tapped hole circle on the upper surface of the upper flange 29 of the base section 20 is coaxial with the axis of the mounting ring 31. This bolt hole circle mounts mounting ring screws 33 which are used to threadedly engage the bolt hole circle on the upper flange 29 and thereby clamp the lens assembly 30 to the upper flange of the base section 20. Intermediate between each of the holes of this same bolt hole circle and on the same bolt hole circle of the mounting ring 31 is a drilled and tapped hole for engagement by the lens hold-down screws 34. Either an O-ring or an elastomeric sealant (neither shown) is used to ensure that the mounting ring seals to the upper flange 29 of the base section 20.

The lens 35 is fabricated from a transparent material such as glass, polycarbonate plastic, or acrylic plastic. The lens is a thin-walled annular body of revolution symmetrical about a vertical axis and having an outwardly extending transverse lens mounting flange 36 at its lower end. The central portion of the lens 35 is a frustroconical body with its diameter upwardly reducing and having an external Fresnel lens 37. The Fresnel lens 37 is arranged with annular prisms so that a light source placed coaxial with and at the midheight of the lens will have its light refracted into a substantially horizontal pattern with only a few degrees of vertical dispersion. At its upper end, the lens 35 is closed with an axially short upwardly converging frustroconical cap having a vertically extending coaxial bird spike 38 to discourage birds from perching on the lens.

The mounting flange 36 of the lens 35 has a bolt hole circle matching the bolt hole circle of plain and tapped holes in the mounting ring 31. The lens hold-down screws 33 extend through every other hole of flange 36 so that the lens 35 can be clamped to the upper surface of the mounting ring 31. An elastomeric sealant or an O-ring (neither shown) is used to seal between the lens 35 and the upper surface of the mounting ring 31. When the flange of lens assembly 30 is abutted with the upper flange of the base section, the other holes in the hole circle of the flange 36 are aligned with the tapped holes in the upper surface of the top flange 29 of the base section 20. The mounting ring screws 34 then clamp both the flange 36 of the lens 35 and the mounting ring 31 to the upper flange 29 of the base section 20. An elastomeric sealant or an O-ring (neither shown) is used to seal between the mounting ring 31 and the upper surface of the upper flange 29 of the base section 20.

The controller assembly 40, shown in its mounted position inside the upper end of the base section 20 and the lower end of the lens assembly 30 in FIG. 4, is physically supported by controller mounting bracket 105. As shown herein by way of example, controller assembly 40 consists of a single printed circuit board with various constituent components mounted on its surface. The controller assembly is provided with a power input terminal strip 53 and a terminal strip 54 for providing power to the light emitter assembly 107.

The controller assembly 40 serves to provide appropriate, conditioned electrical power and, if desired, a programmable blinking pattern for the LED light sources. The input current and voltage to the controller assembly 40 are adjusted and regulated to provide appropriate polarities, voltages, selectably controllable current limits, and timing of any typical navigation aid blinking functions as necessary for the type of LED light source used. The necessary circuitry for providing these functions is included on the printed circuit board of the controller 40, but these elements are not shown or described in detail. Typical circuitry required to perform these functions is well known and has been used for many years in standard commercially available navigation lighting products.

Additionally, the controller 40 is provided with a microprocessor 91, digital memory storage 58, a LED controller 60, and a global positioning system (GPS) radio receiver system 57. These elements can be used to retain information on the location and sunrise and sunset times as a function of geographic position and also to provide means for both determining the location of the lighting system 1 and adjusting the lighting cycle accordingly. The characteristics of these components of the controller assembly 40 and their functions are discussed later in reference to FIG. 5.

Controller mounting bracket 105 is constructed of thin sheet metal having a prismatically shaped profile with an uniform thickness perpendicular to the midplane of symmetry shown in FIG. 4. The prismatic shape of mounting bracket 105 is symmetrical about a vertical plane normal to the midplane of symmetry and has a horizontal bottom, vertical sides extending upwardly to approximately midheight from the bottom, inwardly sloping sides extending above the vertical sides, and a short horizontal top central section.

Mounting tabs parallel to the midplane of symmetry of the mounting bracket 105 and having screw holes are provided for the attachment of the controller assembly 40 by means of screws and nuts (not shown). The printed circuit board of the controller assembly 40 is shaped to fit within the interior of the controller mounting bracket 105. At approximately midheight of the vertical sides of the mounting bracket 105, horizontally outwardly projecting rectangular support tabs with distal vertical axis holes are provided. These holes permit the bracket to be attached with screws (not shown) engaged in the drilled and tapped holes provided for that purpose on the upper surface of the top flange 29 of the base section 20. At the bottom horizontal portion of the mounting bracket 105, vertical holes are provided near the outer sides of the bracket for the mounting of the electrical terminal mounting frame 104. A centrally positioned vertical hole extends through the horizontal top central section of the mounting bracket. 105 for the mounting of the light emitter assembly 107.

The electric terminal mounting frame 104 is constructed of thin sheet metal having a wide U-shaped profile with inwardly extending horizontal tabs at the top of the U. Terminal mounting frame 104 has an uniform thickness perpendicular to the midplane of symmetry shown in FIG. 4. The U-shaped profile is symmetrical about a vertical plane normal to the midplane of symmetry and has a horizontal bottom in which multiple vertical axis holes are provided to serve as mounting points for insulated wire power terminals 103. The multiple insulated input power lines 116 which are integral constituent insulated conductors in the power cable 9 from the battery 41 in the battery case 6, as well as the delivery power lines 117 are attached to the terminals 103. The delivery power lines 117 also are attached to the controller assembly 40 at power input terminal 53. Vertical holes matching those in the bottom of controller mounting frame 105 are provided in the inwardly extending tabs at the top of terminal mounting frame 104. Screw and nut pairs 102 extend through these matching holes in both the terminal mounting frame 104 and the controller mounting bracket 105 to firmly connect those two parts.

The light emitter assembly 107 preferably utilizes light emitting diodes (LEDs) as a light source, but incandescent bulbs or other suitable illumination sources could be used. The LED light emitter assembly 107 described herein consists primarily of housing and support elements for the LEDs 111. Although this type of light emitter assembly has been described in U.S. Pat. No. 7,111,961, it is briefly described here.

The LED light emitter assembly 107 is preferably uses colored high flux LED light sources, which have more limited light outputs than the white high flux LED sources so that more LEDs are required to achieve a given level of brightness. The heat generated by the colored high flux LED sources is less than that of the white high flux LED sources, so that a smaller heat sink is required than for the white high flux sources.

Flange 108 is a right circular disk having a central axial through hole and a concentric annular O-ring face seal groove having a depth in excess of that necessary to properly house an O-ring (not shown) at the bottom of the groove. Flange 108 also has an equispaced array of multiple primary vent holes (not shown) located on a first radius from the vertical axis, and an equispaced array of multiple secondary vent holes (not shown) smaller than the primary vent holes and located on a smaller second radius. One flange 108 with its groove looking upwardly is used as a base for the light emitter assembly 107 and another flange with its groove looking downwardly is used as a cap. Both bases 108 have O-rings mounted in their grooves.

Diffuser lens 113 is a right circular thin walled tube of fused quartz or borosilicate or crown glass or a similar optically clear, heat resistant glass. The inner diameter of diffuser lens 113 is greater than the inside diameter of the O-ring grooves in the flanges 108, and the outer diameter of the diffuser is a close fit to the outer diameter of those O-ring grooves so that the diffuser may be positioned concentrically with the bases 108. While its other faces are smooth, the inner bore of diffuser lens 113 is uniformly frosted by sand blasting or other suitable means so that the roughened inner surface has a statistically consistent random pattern of microfacet angles. Consequentially, the diffuser lens 108 is able to refract outwardly radiating light emanating from the LEDs 111 in such a manner that the intensity of the light emitted from the diffuser, as measured in spherical coordinates, is substantially uniformized for the angles of admissivity of the Fresnel lens 37 in combination with LEDs 111 mounted on the support rod 109. As an alternative, the outer cylindrical surface of diffuser lens 113 may be frosted, rather than the inner surface, with the resultant diffusion and substantial uniformization of the emitted light being similar to that for the frosting on the inner surface.

The light emitter assembly 107 is characterized by three tiered sets of LEDs 111, wherein each LED set consists of four individual LEDs at 90° spacings about a vertical axis. Each LED 111 is provided with two insulated connecting wires (not shown) for conducting operative electrical current for the LED. A hollow right circular cylindrical support rod 109 having male threads of the same size at each end provides a mounting for the sets of LEDs. The outer diameter of the vertical rod 109 is sufficiently larger than the male thread major diameter so that a transverse shoulder is produced between the outer diameter of the support rod and its threads. The lower thread is longer than the upper. The exterior of the hollow support rod 109 is machined to have a set of four identical flats located at 90° spacings about the vertical axis of the rod at three different vertically equispaced tier levels. The individual flats extend for a short direction in an axial direction and each flat has a centrally mounted radial access hole penetrating from the exterior of the rod 109 to the interior. The three sets of tiers for the flats are spaced 30° apart so that, for the total set of twelve flats, one flat is outwardly facing every 30°.

Each tier set of flats mounts a set of four outwardly projecting light source LEDs 111 at the mid height of the flats, with one LED centrally positioned on each of the vertical flat sides. The two connecting wires extending from each LED are passed through the radial access hole of the mounting face for that individual LED and thence through the axial interior hole of the support rod 109. Each of the LEDs 111 is attached to its respective mounting face on support rod 109 with an adhesive such as a high temperature thermally conductive adhesive. Alternatively, a two-part epoxy compounded with a filler such as aluminum nitride or silver to enhance the thermal conductivity of the adhesive bond may be used so that it will readily conduct heat into the body of the support rod 109.

The connecting wires of the LEDs 111 extend out the bottom end of the support rod 109. The connecting wires of the four individual LEDs 111 within a given LED set are electrically interconnected in series, in parallel, or in parallel serial pairs. In addition, the individual LED tiers or modules are also connected in parallel, all by means of the small LED connecting wires which are not shown in FIG. 4 for reasons of clarity. The required wiring pattern depends on the operating voltages needed for the particular type and color of LED 111 being used. The external connections of the LED wires are made on the light emitter assembly terminal strip 54 mounted at the upper end of the controller assembly 40, seen in FIG. 4.

The light emitter assembly 107 is assembled by first placing the diffuser lens 113 around the support rod 109 with its attached LEDs 111. The flanges 108, with O-rings (not shown) in their face grooves and the grooved sides of the flanges facing, are then concentrically shouldered against the opposed outwardly facing shoulders of the support rod 109 so that the distal ends of the diffuser lens 113 are concentrically engaged within the grooves of the flanges. The flanges are then retained by means of a hexagonal retainer nut 112 on each end so that the assembly 107 is rigidized. The completed light emitter assembly 107 is then mounted to the controller mounting bracket 105 by extending the lower end of the support rod 109 through the centrally positioned hole at the upper end of the bracket and retaining the assembly 107 with a hex nut 112 threadedly engaged with the threads on the lower end of the support rod. Following this, the wiring connections can be made to the terminal strip 54 on the controller assembly 40.

Referring again to FIG. 1, the first embodiment of the lighting system 1 is shown. The physical structure of the lighting device 10 has already been described. In FIG. 1, the lighting device 10 is shown where the sun 47 is irradiating the solar panel 5 of the lighting system 1 with incident solar radiation 48. This solar radiation can be converted to electricity by the solar panel 5 and the resultant energy stored in the battery 41 of the lighting device 10 for use as required. By using its GPS receiver 57 of the controller assembly 40, the lighting device 10 can receive radio signals 50 from one or more GPS satellites 49 in orbit around the earth, thereby making known to the controller 40 of the lighting device 10 the geographic position of the lighting device. This lighting system 1 is thus able to operate without outside intervention except for maintenance.

Figure 5:
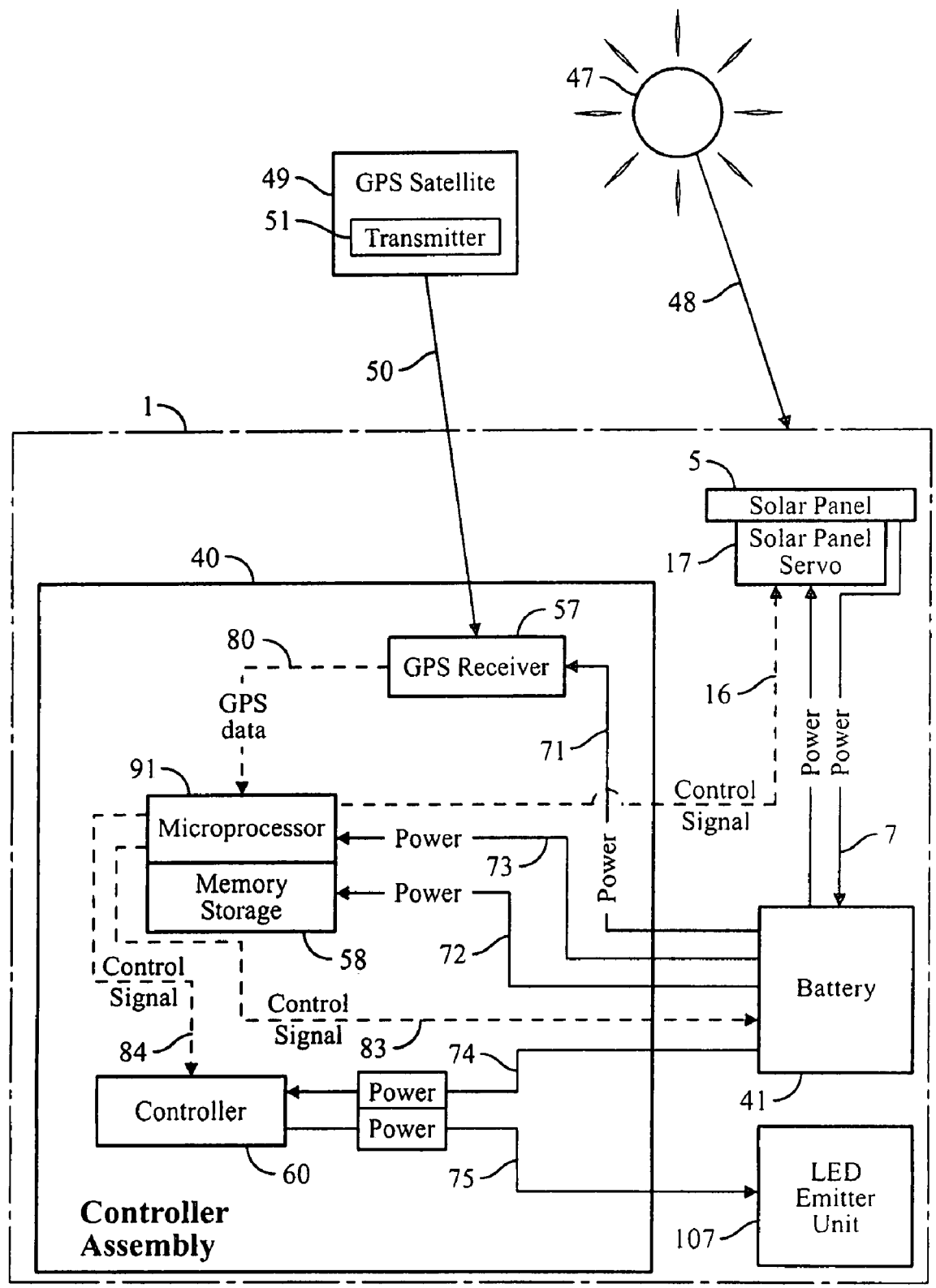
FIG. 5 is a schematic representation of the circuitry of the first embodiment of the present invention.

Referring to FIG. 5, the interrelationship of the functional components of the controller assembly 40 of the first embodiment of the lighting device 10 of the lighting system embodiment 1 may be seen schematically. Terminals, wires, cables, and traces on one or more printed circuit boards are not specifically shown in FIG. 5, but rather, aggregate paths to given components have been given single numbers herein. Typically, as is well known in the state of the art, a power supply is used between the battery 41 and the controller assembly 40 in order to regulate the power supplied to the sensitive components of the controller assembly, but this is not shown herein for clarity.

The operation of lighting device 10 is able to be locally controlled by its controller assembly 40, with the controller assembly under operative control by the encoded instructions in the memory storage 58 of the microprocessor 91. The microprocessor 91 is able to receive GPS data from external sources, reference stored instructions and stored data in the memory 58, issue operational instructions and switching signals to other components of the lighting device 10, and store data in the memory.

As stated previously, solar radiation 48 from the sun 47, collected and converted to electrical energy by the solar panel 5, is transmittable to the storage battery 41 by the battery cable 7. The battery 41 is connected to provide electrical power to the GPS receiver 57, the memory storage 58, the digital microprocessor 91, and the LED controller 60 by power connections 71, 72, 73, and 74, respectively. The charge of the battery 41 can be monitored by a sensor or sensors (not directly indicated in FIG. 5) in communication with the microprocessor 91, and the microprocessor is able to communicate back to the battery by means of connection 73 if necessary in order to operate any battery mounted switches (not shown).

The microprocessor 91 is able to control and receive feedback from the servo of the pivotable bracket 17 of the solar panel 5 through data connection 78 and cables 7 (not shown) and 16, while power to the servo also can flow through cables 7 and 16 from the battery 41. The radio signals 50 from the transmitter 51 of the GPS satellite 49 can be received by the antenna of the GPS receiver 57 of the controller assembly 40 and transmitted to the microprocessor 91 by means of connection 80. The microprocessor 91 also is able to transmit over control signal connection 84 control signals to the controller 60 so that it can switch on or off the power for producing illumination by the light emitter assembly 107. The power for the light emitter assembly 107 is delivered from the battery 41 to the controller 60 by connection 74 and, when enabled by the controller, to the light emitter assembly by connection 75.

Second Embodiment 200 of Lighting System

Figure 2:
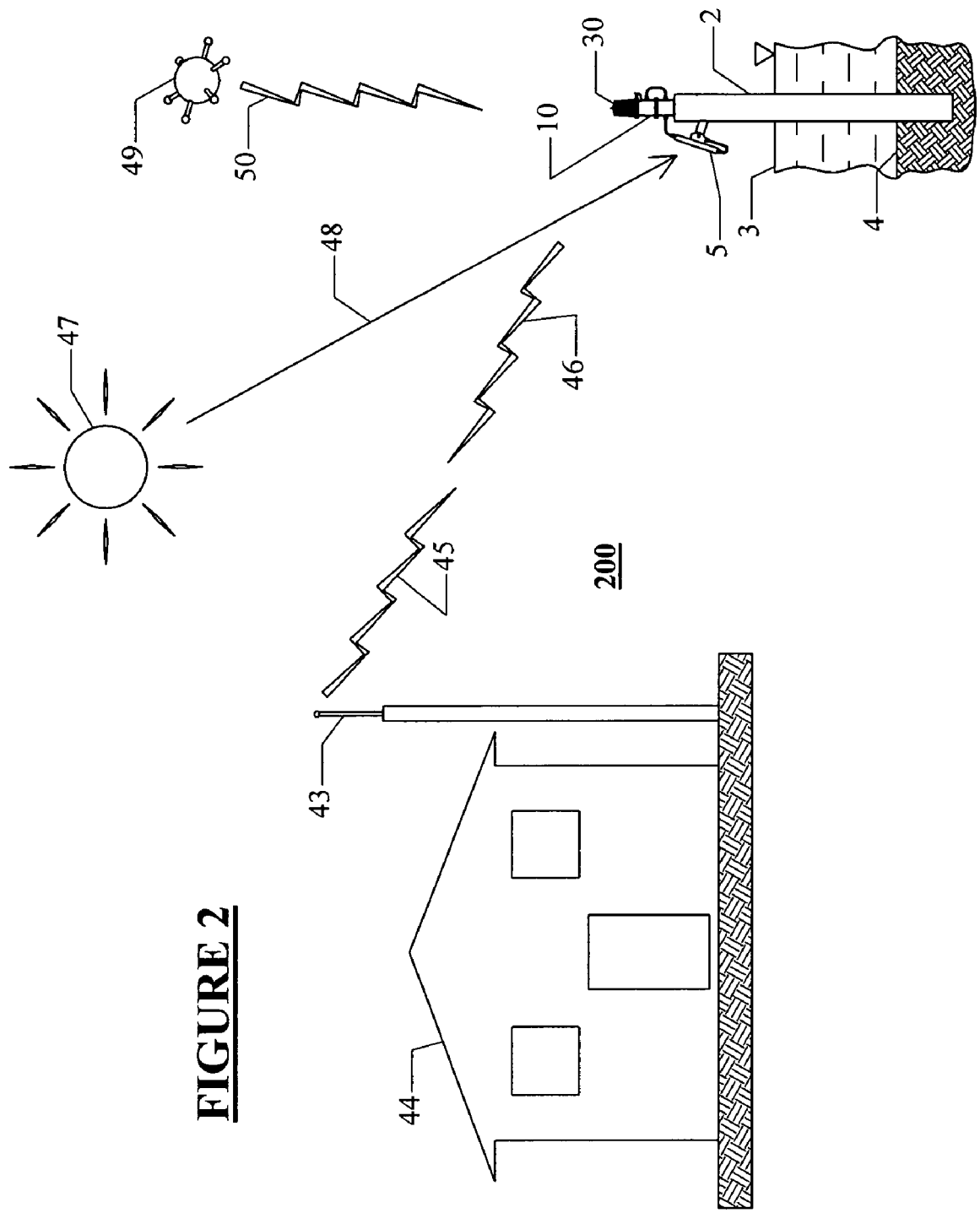
FIG. 2 is a schematic view showing a second embodiment of the marine lantern system of the present invention, wherein a remotely sited operational station can communicate by radio in both directions with the marine lantern system.

FIG. 2 shows a second embodiment 200 of the lighting system which includes the lighting device 10 of the present invention using a different controller assembly 240. As seen in FIG. 2, lighting system 200 externally uses the same basic arrangement as the first embodiment lighting system 1, but with the addition of means for interacting by two-way radio transmissions with a remote base station 44. By way of example, the remote base station 44 is shore based and has transceiving radio antenna 43 which is able to transmit radio signals 45 for reception by the controller assembly 240 of the lighting system 200. Additionally, the controller assembly 240 for the lighting device 10 is able to transmit outgoing radio signals 46 for reception by the antenna 43 of the base station 44.

Figure 7:
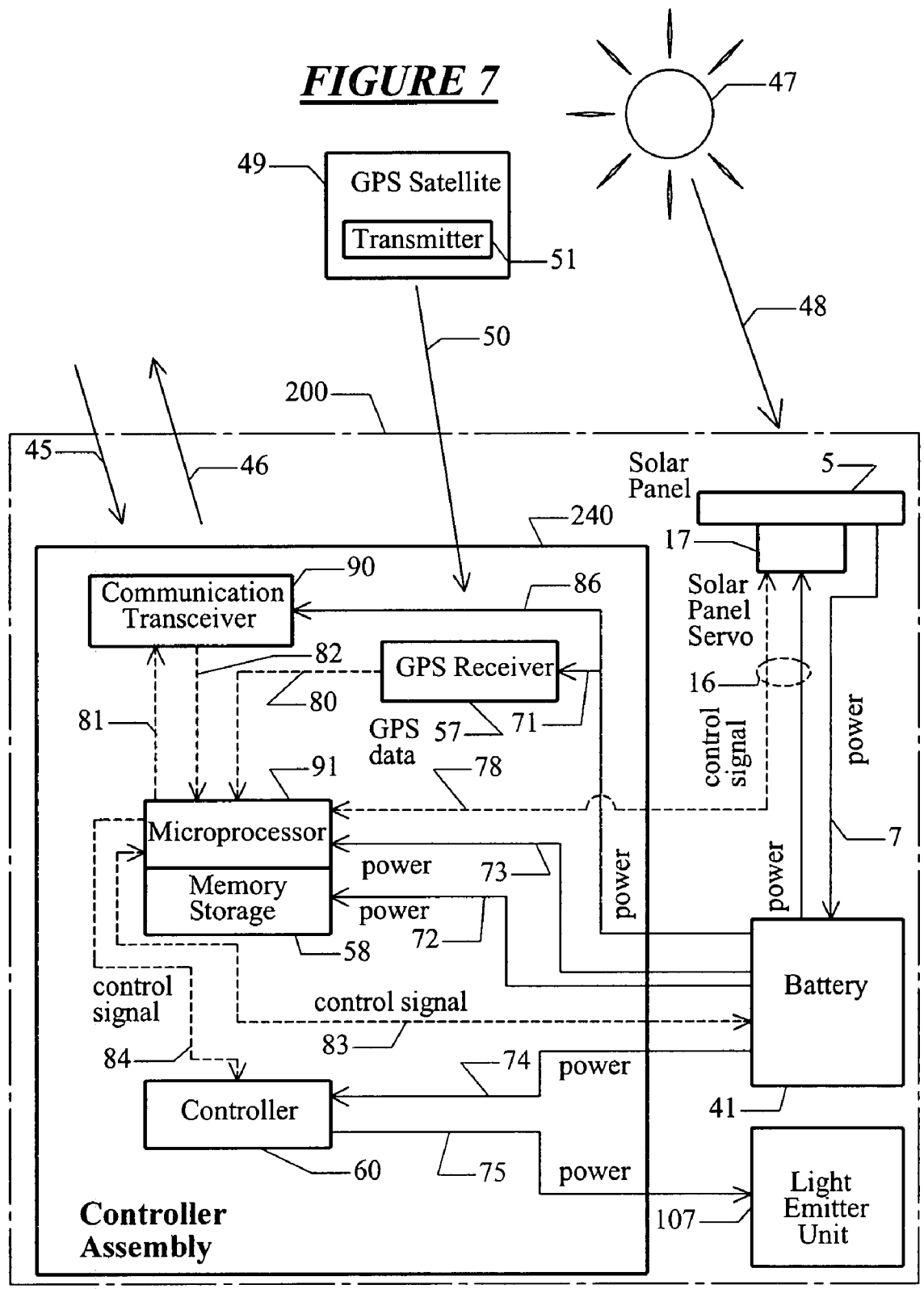
FIG. 7 is a schematic representation of the circuitry of the second embodiment of the present invention.

Referring to FIG. 7, the interrelationship of the functional components of the controller assembly 240 of the lighting device 10 of the lighting system embodiment 200 may be seen schematically. The arrangement of the functional components of controller assembly 240 is substantially identical to that of the controller system 40 of the first embodiment light system 1, with only the addition of a communication transceiver 90 to the controller assembly 240 differentiating the two arrangements. As is the case for FIG. 5 describing the lighting system 1, terminals, wires, cables, and traces on one or more printed circuit boards are not specifically shown in FIG. 7, but rather, aggregate paths to given components have been given single numbers herein. As before, typically a power supply is used between the battery 41 and the controller assembly 240 in order to regulate the power supplied to the sensitive components of the controller assembly, but this is not shown herein for clarity.

Because controller assembly 240 only differs structurally from controller assembly 40 by the provision of a radio transceiver 90 in the former, only the relationship of the transceiver with the other components will be discussed herein. The transceiver 90 is a commercially available unit which is coupled to the input terminals of the microprocessor 91 by incoming communication line 82 and outgoing communication line 81. Power is provided to the transceiver unit 90 from the battery 41 by means of power line 86.

The incoming radio signals 45 from the antenna 43 of the shore station 44 can be received by the integral antenna of the transceiver receiver 90 of the controller assembly 240 and transmitted to the microprocessor 91 by means of connection 82. The microprocessor 91 also is able to transmit data over outgoing signal connection 81 to the transceiver 90 so that it can provide information to the shore station 44 by means of outgoing radio transmissions 46.

Control Logic for the Control Systems 40 and 240

Figure 6:
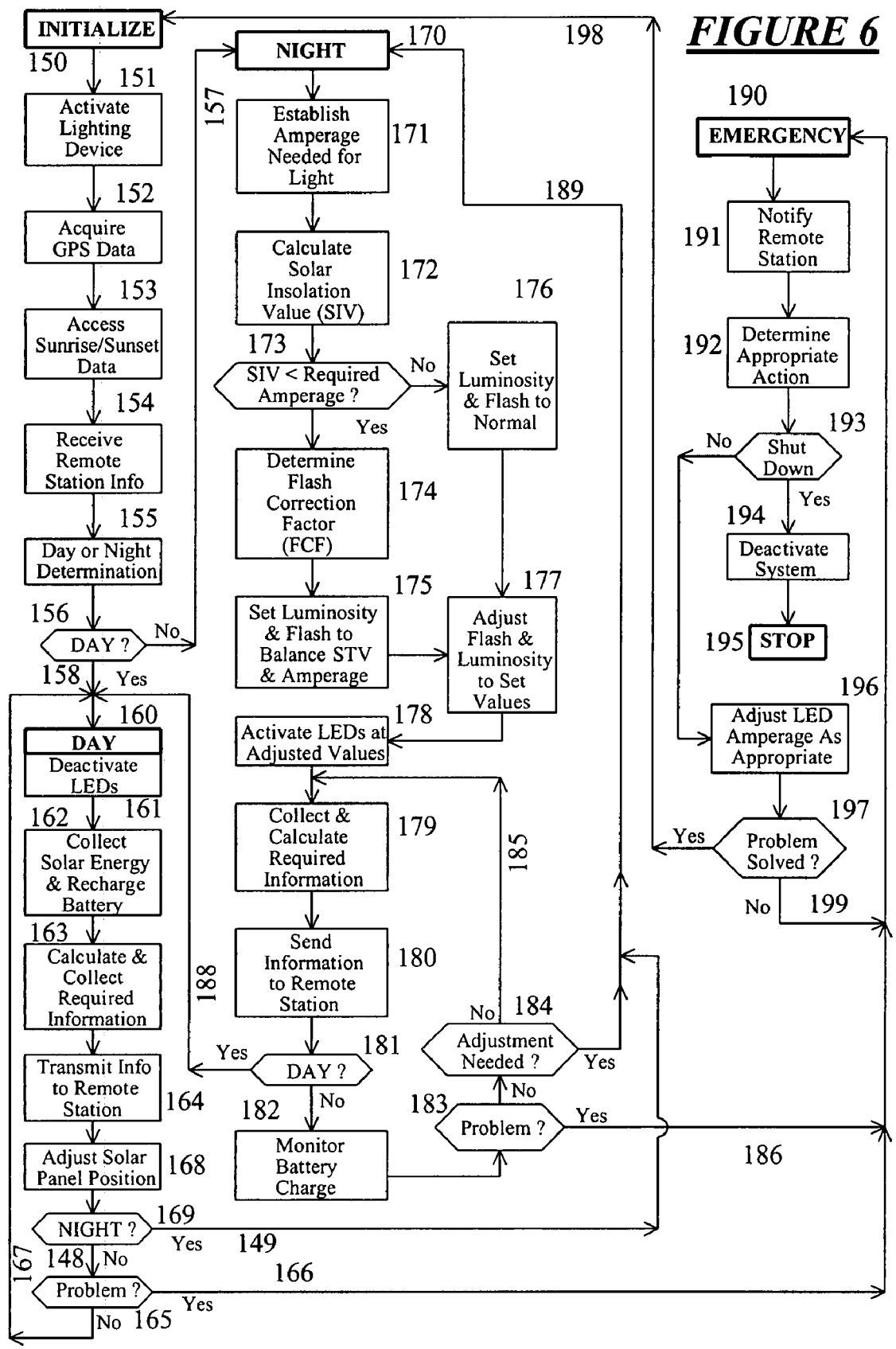
FIG. 6 is a logic diagram for the control circuitry for both the first and second embodiments of the present invention.

FIG. 6 is a block diagram describing the logic used for the code to control the microprocessor 91 and, hence, the overall behavior of the control systems 40 and 240. As shown herein, the logic in FIG. 6 is for the more general case of the control system 240, which has a communications transceiver 90 for receiving and transmitting data with a remote shore station 44. In the description of the sequence of logical operations given below, the logical suboperational steps proceed sequentially unless a decision-based branching occurs. The description herein notes such decision-based branchings.

This same logic for the control system 240 can be used for the control system 40 by using a preset selectable data value in the code, i.e. a digital switch, either to cause enabling or bypassing the outward data transmission of logic step 164 of FIG. 6. Alternatively, the program can permit the transmission information to be issued from the microprocessor 91, but no outward transmission would occur with the control system 40 of the first embodiment 1 of the lighting system. A third alternative for lighting system first embodiment 1 with control system 240 instead of the previously described control system 40 would be to send a signal out, even though no receiver station 44 is used. A fourth alternative would be to omit the logic step 164 of FIG. 6 when the program is used for the lighting system 1.

The logic shown in FIG. 6 for the operation of lighting system 1 and 200 has four distinct branches. The first step is to initialize the system in the INITIALIZE logic branch 150, including making a determination of whether the system is in daytime or nighttime. If the system is determined to be in the daytime, then system control is transferred to the DAY 160 logic branch. If the system is determined to be in the nighttime, then system control is managed by the NIGHT 170 logic branch. If a problem is detected at the end of either the DAY branch 160 or the NIGHT branch 170, then system control is transferred to the EMERGENCY branch 190. As part of the operations performed during the DAY branch 160, the logic checks to see if it is necessary to change to the NIGHT branch 170. Similarly, the NIGHT branch 170 checks if it is necessary to change to the DAY branch 160. The cycling through the logic tree is programmed to occur at a preset frequency determined by a coding input.

The initialization routine INITIALIZE 150 includes the following sequential steps executed by the microprocessor 91 of the control system 40 or 240. Step 151 involves activating the supporting subsystems of the lighting device 10 by activating switches to power all the subsystems (17, 58, 60, 41, 90) shown in either FIG. 5 or 7. Step 152 involves acquiring and also storing in the memory 58 current GPS data 50 transmitted from one or more satellites 49 to the GPS receiver 57 and conveyed to the microprocessor 91 by connection 80, as well as obtaining the local date and time from the either another source or internal coding or via the remote station 44. The date and time data are stored in memory 58 and are utilized by the internal clock of the microprocessor 91.

The Step 153 accesses sunrise/sunset information stored in the memory 58 as a function of the location of the lighting device 10. Alternately for the light device 10 of the second embodiment lighting system 200, the sunrise/sunset information can be obtained via radio transmission 45 from the remote station 44 in step 154. For step 154, any data 45 transmitted from the remote station 44 and received by the communication receiver 90 regarding parameters such as flash requirements, battery specifications, luminosity levels, and emergency procedures is accessed by the microprocessor 91 via connection 82. Step 154 can be skipped if the signal 45 from the remote station 44 is not received because of unreadable or no signal for lighting system 200 or no use of a shore station for the lighting system 1.

Step 155 makes a determination whether it is daytime or nighttime at the specific location of the lighting device 10 according to a coded definition of "daytime" and "nighttime" used by the microprocessor, the geographic position of the lighting system and the local time provided by an internal clock in the microprocessor 91. Step 156 involves switching the control of the subsequent logic path to either the DAY (160) or NIGHT (170) logic branch of the control program according to the state determination made in Step 155. The logic branch 158 is used to transfer to daytime operations, while the logic branch 157 is used to transfer to nighttime operations.

The definition of "nighttime" used for illumination of the lighting device 10 generally starts earlier than actual sundown by a predetermined margin and likewise ends later than sunrise by a similar margin. The definition of "daytime" is the portion of the 24 hour period which is not "nighttime".

The DAY logic sequence 160 has a series of logic steps primarily concerned with power collection and data collection. The first operation in the daytime sequence is step 161, which causes the power to the light emitter assembly 107 to be turned off. Step 162 performs necessary switching to permit the solar panel 5 to collect and store its generated electrical energy in the battery 41. Step 163, the next step, involves collecting source data from the battery 41 and the solar panel servo via connections 83 and 78, respectively. This data and any other desired data is processed in step 163 according to the coding for the microprocessor 91, so that it can be both stored in the memory 58 and transmitted to the remote station 44 if desired. Subsequent step 164 involves transmission of data from step 163 and any other sources to the communication receiver 90 by means of connection 81. The next step 168 involves computing any changes necessary to the position of the solar panel 5 or 250 using an algorithm based on the time of day, date, and location for the lighting device 10 and issuing appropriate instructions to the servo or servos controlling the position of the solar panel. Step 169 involves making a determination of whether nighttime has arrived yet and, if so, switching to logic branch 149 for transfer to the NIGHT 170 logic sequence. If nighttime has not occurred yet, step 169 transfers to step 165.

Continuing with the DAY logic sequence 160, step 165 involves making a decision if a problem has occurred during the preceding steps. The logic of the program is arranged to set a digital indicator if a source of data is unavailable or an operation directed by the microprocessor 91 fails to execute. As a part of the checking for problems in step 165 and similar logical steps 183, 184, 193, and 197, the microprocessor 91 is able to check the appropriate registers of memory 58 used to store the problem digital indicators and, on the basis of the contents of those registers, is able to make its decision. If a problem is determined to exist, step 165 transfers control by logic branch 166 to the EMERGENCY logic sequence 190. If no problem is determined, step 165 transfers control by logic branch 167 back to the start of the DAY logic sequence 160.

The NIGHT logic sequence 170 has a sequence of logic steps primarily concerned with providing the appropriate power to the light emitter assembly 107. The initial nighttime step 171 involves establishing a target amperage and power requirement for the light emitter assembly 107 based upon the desired flash pattern encoded in memory 58, the target light output for the range and intensity of the lighting device 10, and the duration of nighttime calculated from the sunrise/sunset data obtained in step 153. The next step 172 requires the calculation of the solar insolation value (SIV) for the preceding day. The SIV can be based on either the integrated measured charging amperage versus time value (i.e., power input) from the solar panel 5 for the preceding day, the current level of battery charge and its difference from the preceding day, or an estimate based on the duration of daylight and time of year at the location of the lighting device 10. The latter means of estimating the SIV is less precise than the first means and necessitates adding a reasonably large margin to account for loss of solar power gathering due to meteorological conditions. The suitability of monitoring of battery charge from battery parameters such as voltage, temperature, etc. is dependent on the type of battery 41 used for the lighting device 10.

The next step 173 in the NIGHT logic sequence 170 requires determination if the SIV found in step 172 is less than the required amperage calculated in step 171. If the SIV is greater than the required amperage, control is transferred to step 176, where the set points for the luminosity and flash duration are set to their encoded target values prior to transfer to step 177. If the SIV is found to be less than the required amperage in step 173, then control is transferred to step 174, where a flash correction factor (FCF) based on the ratio of required amperage to the SIV is determined. Control is transferred from Step 174 to step 175, which involves calculating the luminosity and flash duration set points to balance the power usage by the light emitter assembly with the power available as a function of the FCF. Control is then transferred from step 175 to step 177.

Continuing with the NIGHT logic sequence 170, step 177 is used to adjust the flash and luminosity to the most recently determined set point values determined by either step 175 or 176. Following step 177, control is transferred to step 178, where the power controller 60 for the light emitter assembly 107 is instructed to provide the power and flash timing values set in step 177.

In step 179 information is collected and calculations are done based on that collected information so that data of interest to a remote base station is available for possible transmission. Subsequent to step 179, step 180 transmits the information from step 179 to the communication transceiver 90 for sending to the remote station 44. As stated previously, for the controller system 40 for which a transceiver 90 is not provided, step 180 can be avoided by means of a digital switch in the logic. Other corrective measures previously mentioned for step 164 can be used if the control system 240 is used with the lighting system first embodiment 1.

Following completion of step 180, the next logical operation is step 181, where the logic is able to determine whether it is daytime or not. If it is daytime, then logical control is transferred by way of logic branch 188 to the DAY logic sequence 160. If it is still nighttime, then the logical control is transferred to step 182, which causes the charge of battery 41 to be measured. The next logical step 183 involves a decision based on a comparison of the battery charge determined in step 182 to a predicted or desired level of charge. If the battery charge is less than the desired level, then control of the logic is transferred by way of logic branch 186 to the EMERGENCY logic sequence 190; otherwise, logical control is transferred to step 184. Step 184 reviews the status data stored in the memory 58 and determines if any adjustments are needed. If any adjustments are required, then logical control is returned to the start of the NIGHT logic sequence 170 by logic branch 189. If no adjustments are required, then control is returned to logic step 179 by way of logic branch 185.

The EMERGENCY logic sequence 190 is used to take corrective actions in the event of system failures, such as inadequate battery charge or light emitter assembly failure. The first step for the EMERGENCY sequence is step 191, which involves transmitting status data to the remote station 44 by way of data sent to the transceiver 90 by the microprocessor 91. Again, one of the same procedures mentioned before for step 164 can be used in the event that there is no remote station 44 used with the lighting system 1. The next operation is step 192, wherein the microprocessor 91 determines what action is to be taken on the basis of its coded evaluational criteria and the data stored in the memory 58. A digital switch indicating system shutdown is necessary may be set as a consequence of the evaluations in step 192. The next step 193 determines if a shutdown of the system is indicated by the shutdown digital switch of step 192 and causes logical control to be transferred. If shutdown is indicated, then control is shifted to step 194 where the microprocessor 91 deactivates the various subsystems of the lighting system 1 or 200. The final logical operation following the deactivation of step 194 is to stop the microprocessor operations and, if desired, to disconnect the system power from the battery 41.

If a system shutdown is not needed, then step 193 shifts logical control to step 196, where the microprocessor 91 adjusts the amperage to the light emitter assembly 107 in accordance with the parameters determined in step 192 and then again monitors the battery charge as in step 182. Following this, step 197 is used to make a logical decision on the existence/nonexistence of a problem using the same logic as in step 183. If the system problem still exists, control is transferred by logic branch 199 back to the start of EMERGENCY logic sequence 190. If the problem is eliminated as indicated by the battery status in step 196, then logical control is shifted back to the INITIALIZE logic sequence 150 by logic branch 198.

Biaxially Adjustable Solar Panel

FIGS. 8 and 9 show a second embodiment of a solar panel 250, wherein the solar panel can be caused to be selectably and independently rotated about both a horizontal axis and a vertical axis. This ability to rotate about these two axes permits the solar panel 250 to track the sun across the sky by rotating about its vertical axis and to also optimize the tilt from vertical by rotating about its horizontal axis in order to maximize the gathering of impinging solar energy.

Referring to FIG. 8, the solar panel 250 is seen from its rear side, obverse to the solar cell side of the solar collector 251, and is shown mounted to a piling 2 by a tubular panel support 253 attached to the piling on a first end and to a vertical axis swivel mounting block 252 on a second end. The vertical axis swivel mounting block 252 has a rectangular prismatic body with horizontally outwardly projecting spaced apart parallel ears at its upper and lower sides. The ears project from the prismatic face opposed to the face to which the panel support 253 is attached. Transversely penetrating both ears are coaxial centrally positioned shaft holes which serve to journal a vertical axis pivot shaft 254. An array of regularly spaced drilled and tapped holes in a bolt circle concentric with the shaft hole is positioned on the upper face of the upper ear to serve as mounting holes for the vertical axis drive motor 257.

The vertical axis pivot shaft 254 has an elongate right circular cylindrical body with a diametrically positioned rectangular keyway in a first end and a Woodruff key slot located at approximately midlength in radial plane of the shaft. A rectangular cross-section vertical axis shaft drive key 255 is positioned in the rectangular keyway in the end of shaft 254, while a Woodruff key serving as a vertical axis shaft transfer key 256 is mounted in the Woodruff key slot of the shaft 254.

Electrical servo-type vertical axis drive motor 257 has a waterproof right circular cylindrical body with a thin outwardly extending mounting flange on one end and a vertical axis drive motor power cable 267 on the other end. Depending upon the motor power, the vertical axis drive motor 257 may be a gear-head motor. Motor 257 has an integral encoder or resolver so that the position of the pivot shaft 254 can be monitored by the control system for the motor. The mounting flange of motor 257 has a bolt hole pattern matching that in the upper surface of the upper ear of the vertical axis swivel mounting block. The mounting face of the body of motor 257 has a central cylindrical recess into which the motor drive shaft extends approximately half of the length of the recess. The exposed end of the drive shaft of motor 257 has a diametrically extending rectangular cross-section keyway engaged with the drive key 255 on the vertical axis pivot shaft 254. The motor 257 is attached to the upper side of the upper ear of the vertical axis swivel mounting block 252 by multiple mounting screws 258 extending through the mounting flange holes of the motor 257 and threadedly engaged in the holes in the upper ear of the mounting block 252. Motors of this type are commercially available, although the flanged mounting may be separately fabricated as an attached accessory.

The horizontal axis swivel mounting block 260 is a rectangular prismatic block with an outer transverse end which is radiused about a midheight horizontal axis parallel to the transverse end. The vertical thickness of the horizontal axis swivel mounting block 260 is such that it is able to fit between the inner surfaces of the ears of the vertical axis swivel mounting block 252. Near the inner end in a vertical midplane parallel to the transverse vertical sides of the horizontal axis swivel mounting block 260 is a vertical bore 277 with a rectangular radially extending keyway. The vertical axis pivot shaft is a snug slip fit to bore 277, and the vertical axis shaft transfer Woodruff key 256 is engaged with the keyway in bore 277. This arrangement permits the vertical axis drive motor 257 to rotate the horizontal axis swivel mounting block 260 about the vertical axis of the shaft 254.

Concentric with the midheight horizontal axis of the radiusing on the outer end of horizontal axis swivel mounting block 260 is a horizontal through bore 276 having a radially extending rectangular keyway. Horizontal axis pivot shaft 261 is substantially identical to the vertical shaft 254, except that shaft 261 is longer. Horizontal axis pivot shaft 261 mounts a rectangular horizontal axis shaft drive key in a rectangular diametrically extending keyway in a first end, while a radially extending centrally located Woodruff keyway mounts a horizontal axis shaft transfer Woodruff key 263. Horizontal axis drive motor 264 is identical to motor 257, but is supplied by motor drive cable 268. The drive output shaft of motor 264 has a diametrically extending rectangular slot engaged with the key 262 in the keyway on the first end of the shaft 261. The shaft 261 is engaged in the horizontal bores 276 of the horizontal axis swivel mounting block 260. The horizontal axis shaft transfer key 263 is engaged keyway in the bore 276 of the horizontal axis swivel mounting block 260. The horizontal axis drive motor 264 is mounted on the solar collector mounting bracket 266, as is discussed below.

The solar collector mounting bracket 266 has a U-shaped profile having vertical ears extending perpendicularly from the outer transverse sides of a thin rectangular mounting surface. The ears have rounded projecting corners and coaxial bores at midheight which journal the horizontal axis pivot shaft 261. The bores in the ears are sufficiently offset from the mounting surface of the mounting bracket 266 that the bracket can clear the vertical axis drive motor 257 when the mounting surface of the bracket is horizontal and above the panel support 253. Note that, alternatively, the vertical axis drive motor 257 could be located on the lower ear of the vertical axis swivel mounting block 252. A regular pattern of mounting holes is provided in the mounting surface of mounting bracket 266, and an array of regularly spaced drilled and tapped holes in a bolt circle concentric with the shaft hole is positioned on an outer face of a first ear to serve as mounting holes for the horizontal axis drive motor 264. Mounting screws 265 engaged in the holes in the mounting flange of motor 264 and threadedly engaged in the mounting holes in the ear of bracket 266 serve to rigidly mount motor 264 to the outside of the first ear of the bracket.

Mounting screws 273 are engaged through the holes in the mounting surface of the bracket 266 and threadedly engaged in corresponding holes in the center of the obverse surface of the solar collector 251, thereby supporting the solar collector. A waterproof junction box 269 is mounted on the obverse side of the solar collector 251. Solar panel cable 270, carrying both power to the battery 41 as well as power from the battery and control signals to and from the servo motors 257 and 264 connects the junction box 269 to the rest of the lighting system 1 or 200. Connections are made internal to the junction box 269 to the motor cables 267 and 268, as well as to the solar cells in the solar collector 251. A water-tight fitting 14 is used to connect the cable 270 to the junction box 269.

OPERATION OF THE INVENTION

As a result of the system configurations disclosed herein, the operation of the lighting systems of the present invention are largely autonomous once installed. Direct on-site human intervention is required only for maintenance purposes, and the initial setting up of the system for a given location is considerably simplified over the situation for prior lighting systems.

The lighting systems of the two embodiments 1 and 200 are both suitable for self-sustaining remote mounting on a variety of platforms. The only significant difference for the two embodiments 1 and 200 is that the second embodiment 200 is configured to have two-way radio communication with a base station 44 geographically separated from the lighting system by means of an integral transceiver unit 90. The logical coding for the operation of the controller assembly 240 of the lighting system 200 differs somewhat from that used for the controller assembly 40 of the lighting system 1 only in regards to that feature.

For both the first embodiment 1 and the second embodiment 200 of the lighting systems, shown respectively in FIGS. 1 and 2, the systems rely upon their solar panels 5 to collect incident solar radiation 48 and convert it to electrical energy which the systems then store in their batteries 41. The electrical energy from the batteries 41 is used to power the lighting systems with their various subsystems. The controller assembly 40 or 240 supplies power to the light controller 60 to illuminate the light sources 111 of the light emitter assembly 107 and that light is refracted into a highly focused horizontal pattern by the lens 37. The power supplied by the light controller 60 is controlled by the microprocessor 91 so that a desired amperage is delivered and a desired flash pattern is provided.

For the two embodiments 1 and 200 of the lighting system shown in FIGS. 1 and 2 and provided with controller assemblies 40 and 240, respectively, the operation immediately after installation proceeds as follows. The lighting system is installed with a charged battery 41. The INITIALIZE logic sequence 150 initiates upon powering up (see FIG. 6), with the controller assembly 40 or 240 and its subsystems being powered during logic step 151. The lighting system 1 immediately determines in logic step 152 the geographic location of the lighting system by utilizing its GPS receiver 57 which relies upon signals 50 from multiple satellites 49. Once the system is located, step 153 obtains the local sunrise/sunset data either from memory for lighting system 1 or by means of signals received from the U.S. Naval Observatory for lighting system 200. The next step 155 makes a determination of daytime or nighttime from the current time and the sunrise/sunset time, following which the logic is transferred to either the DAY 160 or the NIGHT 170 logical sequence.

The logical sequence during daytime proceeds as follows. Step 161 instructs the light controller 60 to remove power to the light emitter assembly 107. The next step 162 activates switches to initiate solar energy collection by the solar panel 5 and thus enable the charging of the battery 41. The third step 163 in the daytime logic sequence 160, used only for the lighting system 200, involves calculating and collecting information which is then transmitted in step 164 to the remote base station 44 by the transceiver 90 of the controller assembly 240. Steps 163 and 164 are null steps for the controller assembly 40.

The next logical step 168 for daytime involves transmitting positioning instructions to the servo motor or motors 257 and 264 positioning the solar panel 5 or 250 and monitoring motor feedback to ensure that the desired position is obtained. A preliminary step for any motor positioning is the computation in step 168 of the desired position of the motors at the current time, given the geographical location and date. The controllability of the orientation of the solar panel 5 or 250 permits maximization of the energy gathering capability of a given solar panel, thus leading to reduced hardware cost. The final two steps for daytime operations check system status. Step 148 evaluates if nighttime has arrived yet and, if so, transfers operative control to the NIGHT logic sequence 170. Otherwise, the next step is to ascertain in step 165 if the lighting system 1 or 200 has a problem, as indicated by values of digital switches activated by a predetermined set of operational problems. If a problem is indicated in step 165, then control is transferred to the EMERGENCY logic sequence 190; otherwise, logical control returns to the start of the DAY logic sequence 160.

As a first step in the NIGHT logic sequence 170, step 171 establishes a target amperage and power requirement for the light emitter assembly 107, based on the sunrise/sunset data in the memory 57 of the microprocessor 91. The next step 172 makes the computation for the solar insolation value SIV as described previously in the apparatus description. This step ascertains if sufficient charge was received by the battery during the preceding daytime period. In subsequent step 173, the SIV from step 172 is compared to the required amperage from step 171. If the SIV is insufficient, control proceeds to step 174, where a flash correction factor FCF (<1) is computed to determine a reduction of power supplied to the light emitter assembly 107. This reduction in power and flash duration to be supplied to the light emitter assembly 107 budgets the battery power available so that the light will be able to shine throughout the night and still maintain a desired margin of reserve power. Step 175 computes instructions for the light controller 60 to deliver the reduced power to the light emitter 107. Control is then transferred to step 177.

If the SIV is greater than the required amperage for the light emitter 107 for the night, as determined in step 173, control moves to logic step 176, wherein the light supply current and flash duration are set to their desired values. Control then shifts to the next step 177, which computes and transmits the operating instructions to the light controller 60. In subsequent step 178, the light emitter assembly 107 is activated at the amperage and flash pattern set in step 177.

Following the adjustments, if any, to the light output and flash in step 178, the controller assembly 240 of the second lighting system embodiment 200 in step 179 collects and calculates any information required for transmission to the base station 44. The controller 240 then causes the transceiver 90 to send the information out in step 180. Note that steps 179 and 180 are null steps for the controller assembly 40 used with the first lighting system embodiment 1.

After step 178 for the first lighting system 1 or step 180 for the second lighting system 200, the next nighttime step 181 performs a check to see if daytime has arrived, based on the sunrise/sunset data stored in memory 58. In the event that it is determined to be daytime, logical control is then transferred to the DAY logic sequence 160; otherwise, the next step is 182. Step 182 measures the charge available in the battery 41, following which control goes to step 183.

In step 183, the battery charge is compared the desired charge at the end of nighttime to establish if there is a problem. The desired charge of the battery 41 is computed as a function of the predicted power usage and the starting power at the start of the current nighttime period. A problem is indicated if power usage exceeds a desired target level by more than a preset margin. If there is a problem, control is transferred in step 183 to the EMERGENCY logic sequence 190; otherwise, control goes to step 184.

Step 184 determines if the battery charge found in step 182 lies between the problem level and the desired target level. If the battery charge has been excessive, adjustment is necessary and control is accordingly shifted back to the start of the NIGHT logic sequence 170. If the power usage is equal to or less than the desired target level, then control is given back to logic step 179 and the current lighting parameters are maintained until daylight or a problem or a need for adjustment occurs.

Whenever a problem occurs, the EMERGENCY logic sequence 190 controls the system operations. The first step in the event of a problem for a control system 240 is to notify the base station 44 by means of a coded radio signal transmitted by the transceiver 90. The control system 40 of the first embodiment lighting system 1 skips step 191. The next step for both lighting system embodiments is step 192, wherein an appropriate action is determined by reading digital switches set by the condition of the operational system components and evaluating the severity and required action according to the values of those digital switches. The required actions are indicated by digital switch values set in step 192. Subsequent step 193 then determines if the lighting system 1 or 200 should be shut down as a function of digital switch values set in step 192. If shutdown is indicated, then step 194 deactivates the system and in step 195 the power for the lighting system is disconnected.

If shutdown is not indicated in step 193, then control moves to step 196, where the amperage and flash of the lighting system are adjusted in a similar but more conservative manner than was done in steps 174, 175, and 177. Subsequent step 197 evaluates if the problem has been solved in step 196. If the problem is unsolved, then control is again transferred to the start of the EMERGENCY logic sequence 190; otherwise, control is transferred to the start of the INITIALIZE logic sequence.

The servo-positioned solar panels 5 and 250 are operated in response to instructions from the microprocessor 91 of the controller assembly 40 or 240. The solar panel 5 has only a single degree of freedom in its ability to change the inclination of the panel relative to the vertical. The azimuth of the solar panel 5 is oriented to point to the noontime position of the sun 47 at the equinoxes, and the single servo is then used to better orient the panel for changes of sun elevation that are both diurnal and seasonal. The servo positioner 17 pivots the panel 5 about its vertical pivot pin 18 to effect the desired tracking motions. This operation of solar panel 5 improves its energy collection capabilities over those of a purely static solar panel to a limited degree.

The biaxially positioned solar panel 250 is able to have the equivalent motions of the single axis solar panel 5 through the controlled motions of its horizontal axis drive motor 264, but panel 250 is also able to follow the azimuthal position of the sun 47 from sunrise to sunset by the motions of its vertical axis drive motor 257. This positioning capability markedly enhances the energy collection efficiency of the biaxially adjustable solar panel 250 over a conventional fixed solar panel by ensuring full intensity exposure of the panel during daytime. This in turn leads to possible reductions in battery and solar panel size, with resulting economies.

As will readily be understood by those skilled in the art, several details in the present invention can be altered without departing from the spirit of the invention. For instance, details of the construction of the adjustable solar panels 5 or 250 can be varied or separate battery housings provided without changing the nature of the invention. Incandescent lights could be used in place of LEDs or a different arrangement of LEDs could be used. Similarly, the control logic shown in FIG. 6 and used for the lighting systems could be altered by using more data transmitted by radio from outside sources in place of encoded data stored in the memory. The logical sequence could also be altered by changing the order of the logic operations or adding other operations. Such changes would not depart from the spirit of the invention.

Although the present invention and its advantages have been described in detail, it should be understood that various changes, substitutions and alterations can be made herein without departing from the spirit and scope of the invention as defined by the appended claims.

What is claimed is:

1. A lighting device comprising:
   (a) a marine lantern positioned within a Fresnel lens to substantially uniformatize the light emitted from the marine lantern, wherein the marine lantern has an adjustable luminosity and an adjustable flash pattern;
   (b) a rechargeable battery;
   (c) a solar panel, wherein the battery is recharged by solar energy collected by the solar panel; and
   (d) a controller in communication with the marine lantern, the battery, and the solar panel, the controller having
   a global positioning receiver for acquiring the geographic location of the lighting device,
   a processor that calculates an amount of solar energy available to the solar panel based on a current date, a sunset time, a sunrise time, and a solar insolation value corresponding to the specific geographic location of the lighting device; and
   a system for adjusting the luminosity and the flash pattern of the marine lantern as a function of the amount of solar energy available to the solar panel.

2. The lighting device of claim 1, wherein the solar panel is repositionable and is tilted to a calculated position to optimize the collection of solar energy.

3. The lighting device of claim 2, wherein the solar panel is biaxially adjustable.

4. The lighting device of claim 1, wherein the marine lantern includes a plurality of light emitting diode sets.

5. The lighting device of claim 1, wherein the processor is programmable and is in communication with a memory storage unit.

6. The lighting device of claim 1, wherein the controller activates the marine lantern for an illumination period, the illumination period being a function of the sunrise and sunset time.

7. A lighting device comprising:
   (a) a marine lantern having a plurality of light emitting diode sets positioned within a Fresnel lens to substantially uniformatize the light emitted from the light emitting apparatus, the marine lantern having an adjustable luminosity and an adjustable flash pattern;
   (b) a rechargeable battery;
   (c) a repositionable solar panel, wherein the battery is recharged by solar energy collected by the solar panel; and
   (d) a programmable controller assembly in communication with the marine lantern, the battery, and the solar panel, the controller assembly having:
   a receiver for acquiring a set of transmitted information,
   a processor, wherein the processor utilizes the transmitted information to determine an amount of solar energy available to the solar panel based on a specific geographic location of the lighting device and a current date, a sunset time, a sunrise time, and a solar insolation value corresponding to the specific geographic location of the lighting device; and
   a system for adjusting the luminosity and the flash pattern of the marine lantern to reflect the amount of solar energy available to the solar panel.

8. The lighting device of claim 7, wherein the receiver is a global positioning system receiver.

9. The lighting device of claim 7, wherein the solar panel is biaxially adjustable to a calculated position for optimizing the collection of solar energy.

10. The lighting device of claim 7, wherein the programmable controller assembly further comprises a data transmitter.

11. The lighting device of claim 7, wherein the processor is in communication with a memory storage unit.

12. The lighting device of claim 7, wherein the programmable controller assembly deactivates the marine lantern each day and activates the marine lantern each night.

13. A lighting device comprising:
   (a) a marine lantern having an adjustable luminosity and an adjustable flash pattern, wherein the marine lantern includes:
   a plurality of light emitting diodes disposed in a radial array about a vertical axis,
   a central member having each light emitting diode mounted on a vertical surface thereof, the central member made of a thermally conductive material to conduct heat away from the light emitting diodes, and
   a Fresnel lens disposed about the vertical axis surrounding the light emitting diodes;
   (b) a rechargeable battery;
   (c) a biaxially adjustable solar panel, wherein the battery is recharged by solar energy collected by the solar panel; and
   (d) a programmable controller assembly in communication with the marine lantern, the battery and the solar panel, wherein the controller assembly includes:
   a receiver for acquiring a set of transmitted information,
   a processor, wherein the processor utilizes the transmitted information to determine an amount of solar energy available to the solar panel based on a specific geographic location of the lighting device and a current date, a sunset time, a sunrise time, and a solar insolation value corresponding to the specific geographic location of the lighting device, and
   a memory storage unit in communication with the processor,
   whereby the programmable controller assembly adjusts the luminosity and the flash pattern of the light emitting apparatus to reflect the amount of solar energy available to the solar panel and repositions the solar panel to optimize the collection of solar energy.

14. The lighting device of claim 13, wherein the receiver is a global positioning system receiver.

15. The lighting device of claim 13, further comprising a transmitter for transmitting data to a remote location.

16. A method of operating a lighting device to enable the lighting device to be customized to a specific location with known sunrise and sunset times, wherein the lighting device comprises a rechargeable battery, a solar panel for collecting solar energy and recharging the battery, and at least one light emitting apparatus to provide illumination, the method comprising the steps of:

acquiring the location and current time and date for the lighting device;

accessing sunrise/sunset data for the location and current date;

determining the amount of solar energy collection time for the location and current date based on the sunrise/sunset data and the location;

determining the amperage needed during nighttime to operate the light emitting apparatus at a desired luminosity and flash;

calculating the potential solar energy recharge amount for the current date based on the location and collection time for the current date;

adjusting the desired luminosity and flash based on the solar energy recharge available;

operating the light emitting apparatus at the adjusted luminosity and flash; and during the daytime, deactivating the light emitting apparatus, collecting solar energy on the solar panel and recharging the battery with the collected solar energy as needed.

17. The method of claim 16, wherein the acquiring step further comprises receiving data from global positioning system satellites and determining the position of the lighting device and the current time and date from the global positioning system data.

18. The method of claim 16, wherein the accessing step further comprises using the location of the lighting device and the current date to obtain specific sunrise and sunset data from a table of values stored in a microprocessor in the lighting device.

19. The method of claim 16, wherein the accessing step further comprises using the location of the lighting device and the current date to calculate specific sunrise and sunset data.

* * * * *